US 7,197,637 B2

(12) United States Patent
Schmidt et al.

(10) Patent No.: US 7,197,637 B2
(45) Date of Patent: *Mar. 27, 2007

(54) AUTHORIZATION PROCESS USING A CERTIFICATE

(75) Inventors: Ernst Schmidt, Ismaning (DE); Burkhard Kuhls, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 744 days.

This patent is subject to a terminal disclaimer.

(21) Appl. No.: 09/792,034

(22) Filed: Feb. 26, 2001

(65) Prior Publication Data

US 2002/0023223 A1    Feb. 21, 2002

(30) Foreign Application Priority Data

Feb. 25, 2000    (DE) ............................... 100 08 973

(51) Int. Cl.
*H04L 9/30*    (2006.01)

(52) U.S. Cl. ..................... 713/157; 713/156; 713/176; 713/189

(58) Field of Classification Search ................ 705/157; 713/157, 176, 189, 156
See application file for complete search history.

(56) References Cited

U.S. PATENT DOCUMENTS

| | | | | |
|---|---|---|---|---|
| 5,229,648 A * | 7/1993 | Sues et al. | ................. | 307/10.2 |
| 5,521,815 A * | 5/1996 | Rose, Jr. | ..................... | 705/28 |
| 5,689,566 A * | 11/1997 | Nguyen | ...................... | 713/155 |
| 5,825,877 A | 10/1998 | Dan et al. | ...................... | 380/4 |
| 5,844,986 A * | 12/1998 | Davis | .......................... | 713/187 |
| 5,883,956 A * | 3/1999 | Le et al. | ..................... | 713/170 |
| 5,903,882 A * | 5/1999 | Asay et al. | ................... | 705/44 |
| 6,105,137 A * | 8/2000 | Graunke et al. | ............. | 713/201 |
| 6,119,226 A * | 9/2000 | Shiau et al. | ................... | 713/2 |
| 6,138,235 A * | 10/2000 | Lipkin et al. | ............... | 713/155 |
| 6,463,535 B1 * | 10/2002 | Drews | ......................... | 713/176 |
| 6,490,513 B1 * | 12/2002 | Fish et al. | .................... | 701/35 |

(Continued)

FOREIGN PATENT DOCUMENTS

DE    197 47 827 A1    10/1997

(Continued)

OTHER PUBLICATIONS

Schneier, Bruce; Applied Cryptography; 1996; John Wiley & Sons, Inc.; 2nd Edition; Chapter 2.*

(Continued)

*Primary Examiner*—Gilberto Barron
*Assistant Examiner*—Jung Kim
(74) *Attorney, Agent, or Firm*—Crowell & Moring LLP (57) ABSTRACT

In a process for insuring data integrity of software for a control unit of a motor vehicle, a central system (trust center) can issue certificates to authorized parties, enabling them to properly sign software for the control unit and import it into a vehicle to enable operation of the vehicle. For this purpose, the trust center (or the vehicle itself) provides a pair of control unit keys having a first and second key. The first key is stored during production of the vehicle in such a manner that it is accessible to the control unit. By means of the second key of the trust center, a first certificate for an authorized party (certificate holder) is signed.

17 Claims, 6 Drawing Sheets

U.S. PATENT DOCUMENTS 6,816,971 B2 * 11/2004 Schmidt et al. ............. 713/189

FOREIGN PATENT DOCUMENTS

| DE | 198 20 605 A1 | 5/1999 |
| DE | 10141737 C1 | 4/2003 |
| EP | 0 813 132 A2 | 12/1997 |
| EP | 1128242 A2 | 8/2001 |

OTHER PUBLICATIONS

Stallings, William; Cryptography and Network Security; Jun. 04, 1998; Second edition; Prentice-Hall, Inc.; Chapter 11.*

Verisign; Certification Practice Statement; May 30, 1997; VeriSign, Inc.; ISBN 0-9653555-2-7.*

* cited by examiner

AUTHORIZATION PROCESS USING A CERTIFICATE

BACKGROUND AND SUMMARY OF THE INVENTION

This application claims the priority of German patent document 100 08 973.9, filed 25, Feb. 2000, the disclosure of which is expressly incorporated by reference herein.

The invention relates to a process for ensuring the data integrity of software for a control unit of a motor vehicle.

Current increased utilization of electronics and of communication systems in vehicles has generated a growing demand for measures to assure data and software security.

For example, microcontrollers, which are now used for control purposes in many different areas of the vehicle, are often connected by one or more bus systems. In most cases, it is possible (for example, via a diagnostic connection) to access this bus from outside the vehicle, and to communicate with the individual control units.

The operation of the control units (sometimes referred to simply as a "controller") is controlled by software programs, which have usually been filed heretofore in a non-programmable memory (for example, in the case of masked microcontrollers). As a result, the software cannot easily be manipulated. For example, the complete exchange of a memory chip for another memory chip can be detected and remedied. However, the future use of programmable, particularly so-called flash-programmable control units in the vehicle increases the risk of unauthorized manipulation of the software, and of the operation of the control units; the exchange of software by unauthorized persons could simply take place at low expenditures by reprogramming.

However, for security reasons, and to meet legal requirements, measures must be taken which either prevent a changing of original software, or which allow only authorized persons to make such changes.

In addition, it may be advantageous in the future to follow a uniform-parts concept, in which the same hardware is used in different models. Operational differences will then be achieved merely by different software. (This concept, of course, requires that certain software can be run only in an individual vehicle and cannot easily be copied.)

A large number of authentication processes and systems are known from the prior art. For example, U.S. Pat. No. 5,844,986 discloses a process for avoiding unauthorized intervention in a BIOS system of a PC. Based on a so-called public-key process with public and secret keys, a cryptographic coprocessor, which contains a BIOS memory, carries out, an authentication and examination of a BIOS change by checking a digital signature embedded in software which is to be imported into the system. Moreover, European Patent Document EP 0 816 970 discloses a system for examining corporate software in which a system for authentication of a boot PROM memory comprises a memory part with a microcode. An authentication sector comprises a hash generator which generates hash data in response to the implementation of the microcode. Neither of the above-mentioned processes or systems, however, permits direct examination of software to be imported into a control unit of a motor vehicle.

European Patent Document EP 0 813 132 discloses an authentication process in which a program is coupled with a certificate and an access list. According to a preferred embodiment, a certifying agency generates one certificate for a code and one certificate for the access list. Once the certificate has been allocated, it will no longer be possible to change the code or the access list without violating the certificate. The code and the access list are stored together with their certificates in a server. By means of this process, a customer, who requests the code or the access list, can determine their authenticity. However, it is not easy to apply this process to the motor vehicle field.

It would generally be advantageous to utilize several authorized parties for generating and authentically characterizing requested software. As a result, such characterization would not have to be carried out by a central location alone. However, in addition, a central monitoring point should also be set up for issuing the authorization to selected authorized parties.

It is an object of the present invention to provide a process for ensuring the data integrity of software for a control unit of a motor vehicle, in which several authorized parties which can be controlled by a central system, can generate authentic software and correspondingly characterize it.

This and other objects and advantages are achieved by the process according to the invention, in which a central system (referred to herein as a trust center), can issue one or more certificates to authorized parties, which enable them to properly sign software for a control unit and import it into a vehicle so that it is capable of running. For this purpose, for example, the trust center (in an alternative embodiment, the vehicle itself) provides a pair of control unit keys having a first and a second key. The first key is stored, during the production of the vehicle, in the control unit itself or where it is accessible to the control unit. By means of the second key of the trust center, a first certificate for an authorized party, in the following called the certificate holder, is signed.

For reasons of clarity, it will first be assumed that only one certificate is required for an executable reading of new software into a control unit. In a certification information part, this certificate contains, in addition to specific certificate information, at least a first key of the certificate holder who has himself generated a pair of certificate keys with a first and a second key. For example, the certificate issuer, a serial number, the certificate holder, certain access rights or a validity period can be defined as additional certification information.

The authorized party or certificate holder will then sign the software to be imported into the control unit, by means of his second key of the pair of certificate keys. Both the certificate and the software signed by the certificate holder will then be imported into the control unit of a vehicle. By means of its own first key of the pair of control unit keys, the control unit recognizes the legality of the certificate and accepts the certificate information, including the key contained therein. By means of this key (the first key of the pair of certificate keys), the signature of the imported software is checked. If this signature is also recognized as unobjectionable, it will be accepted by the control unit.

By means of this approach, changing and signing rights can generally be awarded. Not all software has to be signed by the holder of the pair of control unit keys, for example, the trust center itself. By means of the additional information in the certificate, it is also possible to assign to the certificate holder a large number of concessions or restrictions. For example, a time period can be granted for which the certificate holder can generate and import software. Various authorization levels for generating software and the type of software can be awarded. However, the signing of the software itself always takes place by the certificate holder himself.

Keys are generally coding and/or decoding parameters which can be used in known cryptographic algorithms.

Moreover, both symmetrical and asymmetrical processes can be used: in symmetrical processes, the two keys are identical so that actually only one key need be present at different sites, while in an asymmetrical process, different keys are used. One generally known asymmetrical process is the public-key process, in which a public and a secret (private) key are generated. The public key may be known to anyone. Such cryptographic algorithms are, for example, the Rivest-Shamir-Adleman ("RSA") Algorithm, Data Encryption Algorithm (DEA Algorithm) and similar algorithms, which are asymmetrical processes. These algorithms can be used for both the first and second pairs of keys.

In a more complex further development of the present process according to the invention, not one but several certificates n are awarded for checking software imported into a control unit. This results in further design possibilities. On the one hand, it is possible to distribute various certificates to different persons, so that an executable importation of new software into a control unit can be implemented only jointly. In addition, it is possible to award various access rights by way of the different number of certificates.

When several certificates are used, the signature of the first certificate can be checked by means of the key filed in the control unit. The signature of each additional certificate can, in turn, be checked by means of the key contained in a previously accepted certificate. By means of the key in the last certificate, the signature of the software itself is finally checked. Only if all checks have been successful, will the software be accepted by the control unit. In order for the signature of a certificate to be checked by means of the key contained in a previous certificate, it must have been signed by means of the second pertaining key.

The selection as to where the secret keys and the public keys are in each case to be filed can be varied greatly. For example, the public keys are, in each case, filed in the certificate information of a certificate. The public key of the pair of control unit keys can also be filed in the control unit. Correspondingly, the signature to be checked must have been formed by means of the pertaining secret key.

Naturally, other embodiments are also possible in which the secret keys are filed in the certificate information and/or in the control unit itself. Combinations with symmetrical keys are also possible.

The key filed in the control unit is best filed in the boot sector, which is normally protected in a special manner. To increase security, the boot sector can also be constructed such that, after the inscription and the filing of the key contained therein, it is "blocked" (that is, blocked for future access, particularly writing access).

If all checks are positive (certificate check and software check), the software is accepted by the control unit or a system provided specifically for this purpose and can be used for controlling of the control unit.

As described above, the public key in the case of the so-called public-key process may be publicly known, whereas the secret key is known only at an authorized party.

According to a special embodiment, the secret key of the pair of control unit keys is known only to the trust center and the secret key of a pair of certificate keys is known only to the certificate holder. By means of each secret key—analogous to a handwritten signature—a digital signature can be generated for an electronic document (certificate, software). Only the holder of the secret key can generate a valid signature. The authenticity of the document (certificate, software) can be checked by the verification of the signature by means of the public key. An unauthorized third party, who does not know the secret key, will not be able to generate a valid signature. If a manipulated, expired or non-authorizing certificate is loaded into a control unit, or manipulated and not correctly signed software is loaded into the control unit, this is recognized by means of the respective pertaining key and the control unit is changed to a inoperable condition.

When a symmetrical process is used, to increase security, an additional activating protection can be used in the form of special hardware.

In order to meet the demands attending use of the software exclusively for an individual vehicle, the software provided for a control unit of a specific vehicle contains vehicle-specific information, such as the chassis number or other vehicle-specific data. This information is assigned to the software or integrated in it. Only after the assignment or integration of these data to or in the software, will this software then be signed by means of the second key of the certificate holder of the last certificate. As described above, a control unit will accept the software only if, on the one hand, the certificate or certificates and, in addition, the signature of the software were recognized as being unobjectionable. Because the signature depends on the vehicle-specific information contained in the software, it cannot be subsequently changed. Software can be fed so that it can be run by a control unit of a vehicle only if the vehicle-specific information is not changed and actually corresponds to that of the vehicle. Copying of such individualized software to another vehicle is therefore impossible.

In order to provide another security level during the importing of software into the memories of the control unit, it should be possible to access the memory of the control unit beforehand only by means of a corresponding authorization. For this purpose, before the signed software is exported, the control unit is "unlocked" in a log-on step. When different prioritized levels are used during the log-on, in addition, differently designed access rights may be awarded. For example, in the case of a diagnostic access, a log-on would first be required, whereby the control unit recognizes by means of the fed access information the access rights and the authorization step connected therewith. Depending on the awarding of rights, the access authorizations may be classified from uncritical to very critical. The awarding of the rights can be designed to be static so that, for example, different access codes are issued for certain authorization stages. As an alternative, the awarding of rights can be designed to be dynamic so that, for example, access certificates are awarded in whose certificate information contains the authorization stage.

In one embodiment, the checks of the signatures are carried out in the control unit itself. According to another embodiment, at least one check can be implemented in an own access control. Because of the centralization of the security function with respect to the award of access rights, a control unit which may be provided exclusively for the access control, in comparison to the other control units should not be accessible in the motor vehicle because the above-described protection mechanisms could possibly be circumvented by physical removal of a control unit.

In order to prevent a control unit from being completely removed and replaced by another, an additional control unit removal protection may be useful. For this purpose, for example, a control unit authenticity check is carried a periodically out in a vehicle, in which the control units are integrated. An inquiry is therefore occasionally directed to each control unit, and the latter must answer with specific expected information. If the information actually emitted by the control unit to be tested does not correspond to the expected information, or if the control unit does not answer, suitable safety measures will be taken. For example, the control unit is excluded from the communication composite, or the control unit is registered, characterized or entered into a list. During a diagnosis of the vehicle, the manipulation can then be detected. In the above-described embodiment, the control units respond upon request, for example, by means of a secret, control-unit-specific authentication key. An illegally exchanged control unit does not have such a key and will therefore not be accepted.

Other objects, advantages and novel features of the present invention will become apparent from the following detailed description of the invention when considered in conjunction with the accompanying drawings.

DETAILED DESCRIPTION OF THE DRAWINGS

Figure 1:
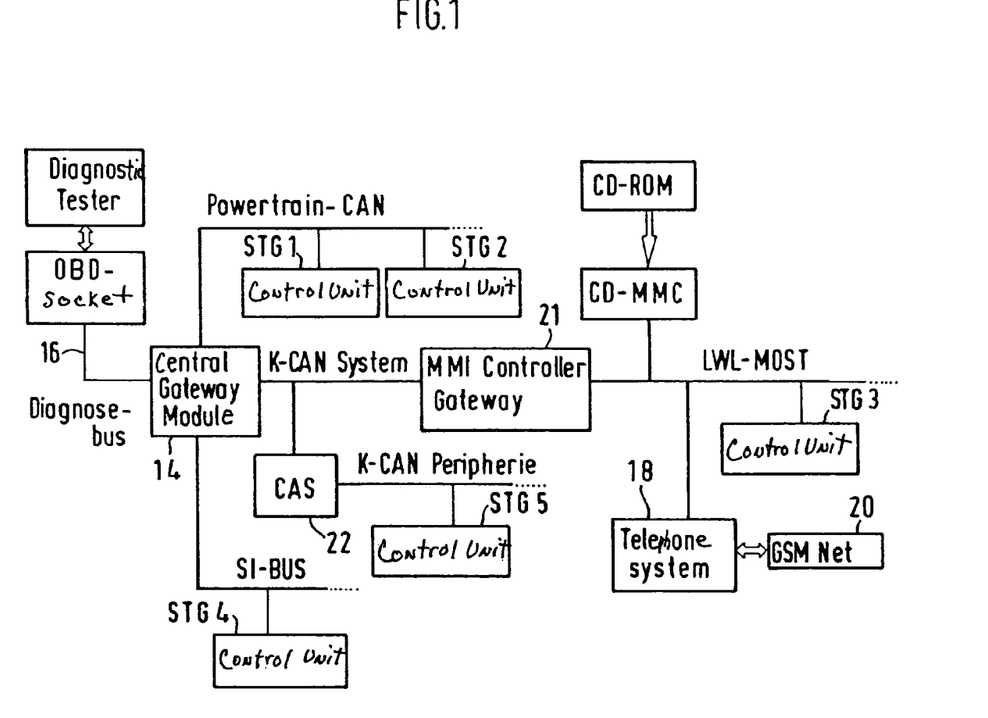
FIG. 1 is a schematic representation of a control unit structure in a vehicle.

FIG. 1 is a block-diagram-type view of a control unit structure with mutually networked units. The on-board network consists of several subnetworks (LWL-Most, K-CAN System, Powertrain-CAN, etc.), some of which have different transmission speeds, and are connected with one another by so-called gateways (central gateway module, controller gateway). By means of the central gateway 14, a diagnostic bus 16 is coupled directly or indirectly with all other networks. The diagnostic bus 16 is one of the most import connections to the environment. A diagnostic tester at the end of the diagnostic bus 16 is connected to an OBD socket (OBD—on-board diagnosis) and with the interposition of the central gateway 14, it permits all controllers, gateways and control units in the entire system to be addressed.

Alternatively, it is possible to access the units in the vehicle via the GSM network 20 and via a telephone system in the vehicle. This permits, in principle, remote access to the vehicle on-board network. In this case, the telephone system 18 also represents a gateway between the cellular network (GSM network) and the other vehicle bus users.

A car access system (CAS) 22, which monitors access to the vehicle, is integrated in the vehicle bus, and contains an electronic drive-away block as another function.

A Multimedia Changer (MMC) represents an interface between a CD player and the on-board network. In the case of the controller gateway 21, inputs from the driver via the different instruments are converted to communication and transmitted to the respectively addressed control units.

In addition, several control units (STG1 to STG5) are illustrated. The task of a control unit is not only to control a specific unit in the vehicle, but also to communicate between the units themselves. Communication in the vehicle is "broadcast oriented" in this case. A generator of information which has gained access to the bus, basically sends its information to all control units. For this purpose, the data bus, which is connected with the controller, is permanently monitored. In contrast, during a communication with the environment, for example, by way of the diagnostic bus, each control unit is addressed in a targeted manner by means of an unambiguous address.

In the future, the software which determines the functionality of the control unit will be predominantly housed in a programmable flash memory. During a flash programming, only entire blocks can be erased and newly inscribed. The erasing of individual bits is not possible. Different types of microcomputers are used depending on the control units which, depending on the requirements, may be 8-bit, 16-bit or 32-bit processors. All these control units or controllers are available in several variants. They have, for example, a flash memory on board or integrated directly in the processor itself.

The encryption which is used in this case will now be discussed. For the authentication process which is used, asynchronous encryption is preferable. In the case of symmetrical keys, each side must be in possession of the secret. As soon as a synchronous key becomes known, effective encryption can no longer be guaranteed. However, because one key of the pair of keys must be stored in the control unit of a motor vehicle and it can therefore not be ensured that it can be kept secret, the selection of a symmetrical pair of keys is not advisable.

In contrast to the symmetrical encryption, W. Diffie and M. Hellman in 1976 developed the so-called public-key cryptography. In the case of this type of encryption, a pair of keys is generated which has a public key and a secret key. By means of the public key, anyone can decrypt, but no encryption can take place. In contrast, the secret key is required for encrypting (signing).

The public-key process has the advantage that one key of the pair of keys can be publicly known. However, since the public-key processes known today are very computing-intensive, hybrid processes (a combination of symmetrical and asymmetrical processes) are frequently used. In a hybrid process, a symmetrical key is exchanged by means of a public-key process between the communication partners. The actual communication will then be encrypted by means of the symmetrical key.

By separating secret and public keys, authentication procedures and digital signatures can be implemented as described above. As a result of the possession of the secret key, an identity can be unambiguously proven and a signature can be generated as in the case of a handwritten signature. One known public-key crypto system is the above-mentioned RSA process. Other public-key crypto processes are based on problems relating to the computing of logarithms in certain mathematical groups (discrete logarithm problem).

The present invention will now be described by reference to a specific embodiment, in which a customer desires a specific additional function in his motor vehicle. For example, the transmission is to be operated by means of different characteristic shifting curves. This function can be implemented by importing of new software into a control unit of the vehicle. For this purpose, the customer consults an authorized party, such as a dealer who can generate such software and can import it in an executable manner into his vehicle.

In order to avoid having to have all ordered software volumes signed by a single party, first several decentralized authorized parties—so-called certificate holders—(for example, dealers) are established, where a desired software can be ordered. By the awarding certificates, the authorized parties are enabled to generate the ordered software themselves, and also to sign it.

Figure 3:
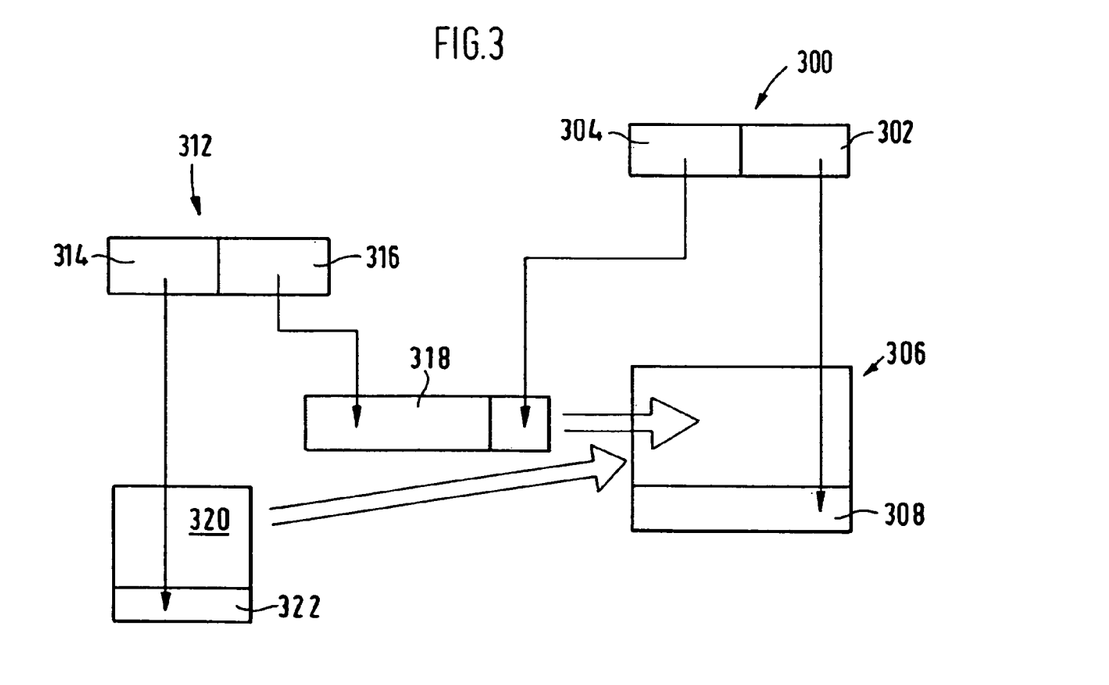
FIG. 3 is a schematic representation of the sequence for awarding individual signatures so that software can faultlessly control a control unit.

The sequence will first be explained in detail with respect to FIG. 3. In a trust center (404 in FIG. 4), a first pair of keys 300 is generated which has a private key 304 and a public key 302. A key is an electronic code by means of which an information can be encrypted and/or decrypted. Known cryptographic algorithms are used here, such as the above-described RSA or DEA algorithms (so-called "public-key algorithms") with asynchronous pairs of keys.

The public key 302 of the trust center is filed already during the production of a vehicle in a control unit 306 in the boot sector 308. However, by means of the private key 304, a certificate 318 is now signed which contains certain certificate information.

The certificate holder also generates a pair of keys 312 (second pair of keys) with another private key 314 and another public key 316. The public key 316 is filed as certificate information in the certificate 318. Additional certificate information may, for example, be the certificate issuer, the serial number, the certificate holder, certain access rights or the validity period.

By means of the private key 314 of the certificate holder, which is known only to the latter, software 320 is signed (signature 322) in a manner which will be described in the following. The certificate holder will then import the certificate 318 which is constantly with him, as well as the generated and signed software 320, into the control unit 306.

Figure 6:
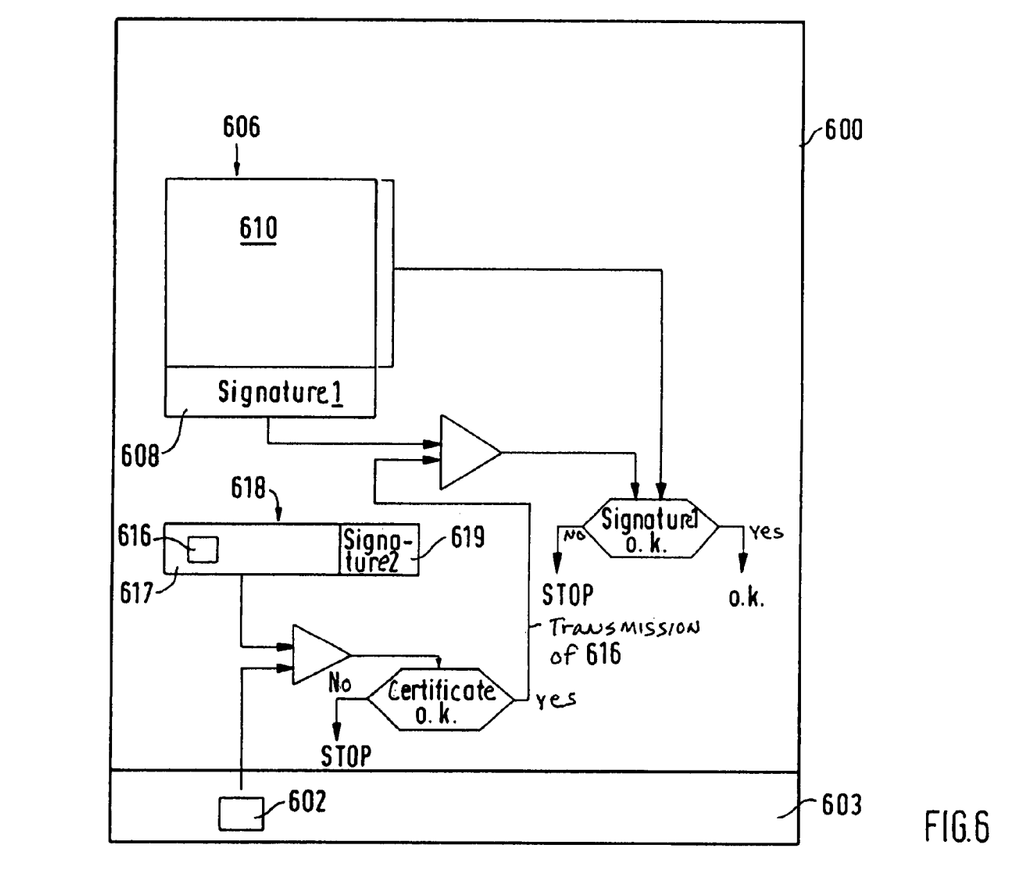
FIG. 6 is a schematic representation of the sequence of the checks in a control unit for the verification of imported software.

As shown in FIG. 6, the control unit 600 (reference number 306 in FIG. 3), during its first start-up after the import, first checks whether the certificate 618 is faultless. For this purpose, the signature 2 619 of the certificate 618 is checked by means of the public key 602 of the trust center filed in the boot sector 603 of the control unit 600. If the certificate 618 is found to be o.k. (yes), the certificate information 617 stored therein, together with the public key 616, is also accepted. If the certificate or its signature 619 is not verified to be faultless (no), the operation of the control unit is stopped (stop).

By means of the public key 616 contained in the certificate 618, the signature 1 608 of the software 606 is checked again. After this test has also been passed (yes), the control unit can be operated by means of the newly imported software 610 (o.k.). Otherwise (no), the operation of the control unit 600 is stopped (stop).

On the whole, by means of the described approach, authorized parties which are authorized to sign software should be decentralized. Many different possibilities exist for including further authorizations and restrictions in the certificate. If the certificate contains a validity period, after the expiration of the validity period, a previous certificate holder can no longer sign software, or the latter will no longer be accepted because the certificate is no longer accepted. In addition, by way of the holder of the certificate, it is also possible to determine who has read software into a control unit and has therefore carried out a modification.

Figure 2:
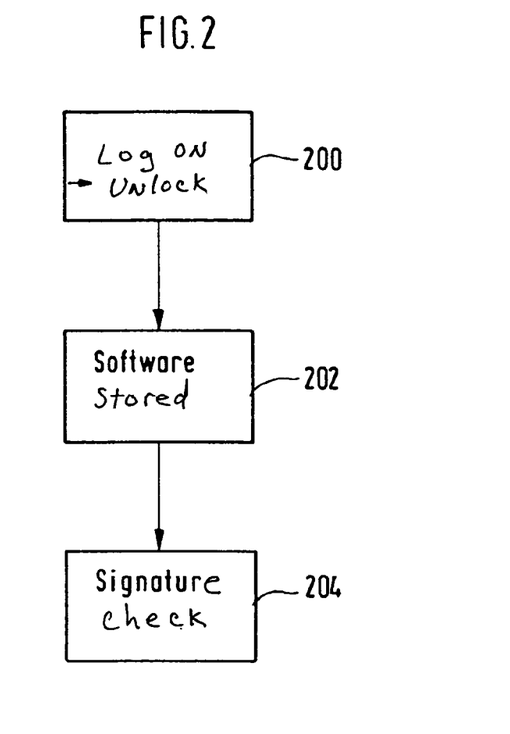
FIG. 2 is a flow chart for reading software into a control unit.

FIG. 2 illustrates another security stage. If new software is to be imported into a control unit of a vehicle, a log-on must first take place (step 200 in FIG. 2). During the log-on, an identification of the authorized party takes place. Only in the case of a successful identification, will the control unit be "unlocked", whereby in principle a reading of new software and of the certificate into the control unit is permitted (step 202 in FIG. 2). The above-described verification of the certificate and of the software will take place only after the reading-in.

The generation of the certificate will now be illustrated more clearly. First, the trust center and a third party must agree that a certain authorization stage is awarded to this third party as the certificate holder, for reading altered software into a control unit or for a control unit of a vehicle. If an agreement has been achieved, the future certificate holder (such as a shop 400) will generate its own pair of keys with a private and a public key and sends the public key with a certificate request (step 402 in FIG. 4) to the trust center 404.

Figure 4:
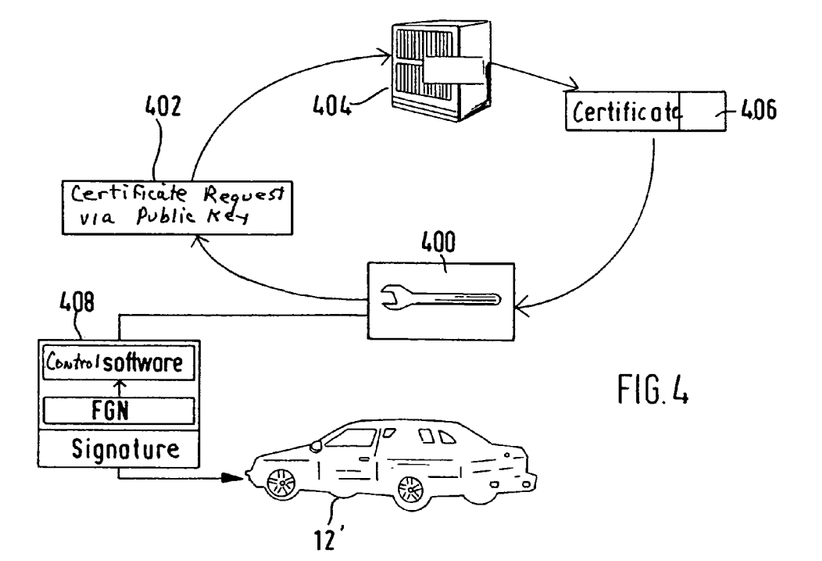
FIG. 4 is a schematic representation for awarding a certificate by a trust center.

The trust center 404 generates the certificate 406, signs it by means of the secret key (compare also reference number 304 in FIG. 3) and sends it back to the certificate holder 400, where it remains.

Figure 5:
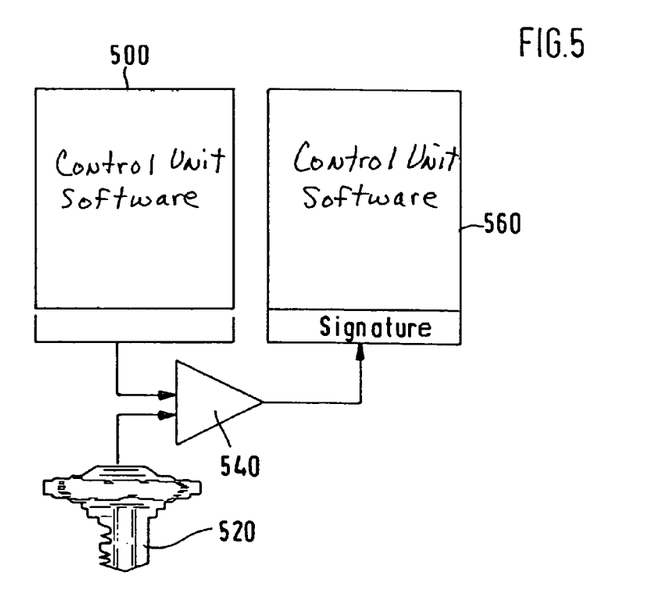
FIG. 5 is a schematic representation for generating a digital signature for software.

As of the receipt of the certificate and to the extent that he is permitted by the certificate 406, the certificate holder 400 can sign software 408 (also reference number 320 in FIG. 3) by means of his private key. This is illustrated in detail in FIG. 5. There software 500 is signed in a unit 540 by means of the secret key 520. The signed software 560 will then be ready to be imported into the control unit of a vehicle, as is also shown with reference to FIG. 4. There, the signed software 408 as well as the certificate 406 are imported by the certificate holder into a vehicle 12.

Figure 7A:
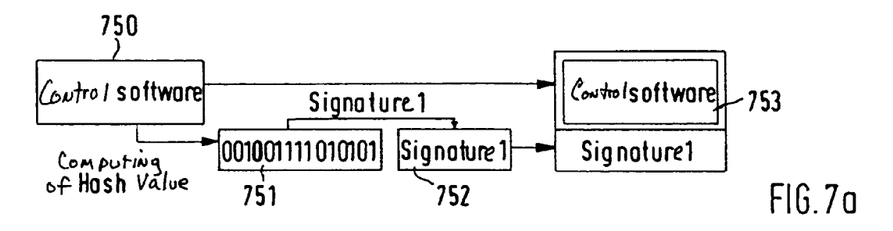
FIGS. 7a to 7d are representations for the encrypting and verification of the certificate and the software while using a hash code.
Figure 7B:
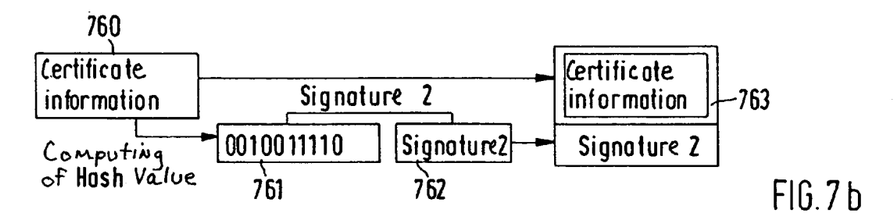

The signing of the software and of the certificate as well as the check of the respective signature will be explained in detail with reference to FIGS. 7a to 7b.

It is inefficient to sign an entire electronic document in its totality. In contrast, a so-called hash function will be used for this purpose in this case.

More precisely, from the software 750 by way of a known hash function, a so-called hash code 751 is generated which is a digital information of a defined length. This hash code 751 is then signed by means of the secret key of the certificate holder (signature 1 752). The signing of the hash code 751 is significantly more efficient than the signature of long software documents. The known hash functions have the following important characteristics: It is generally difficult to find a value M of a document with respect to the defined hash value h (one-way function). In addition, it is difficult to find a collision; that is, two values M and M' at which the hash values are identical (collision resistance).

As mentioned above, the requested software 753 can be generated and signed by the certificate holder himself.

A certificate is generated analogous to the software (FIG. 7b) From the entire certificate information 760, including the public key of the certificate holder, by way of the same or a different hash function, another hash code 761 is generated which is a digital information of a different defined length. This different hash code 761 is then signed by means of the secret key of the trust center (signature 2 762).

Figure 7C:
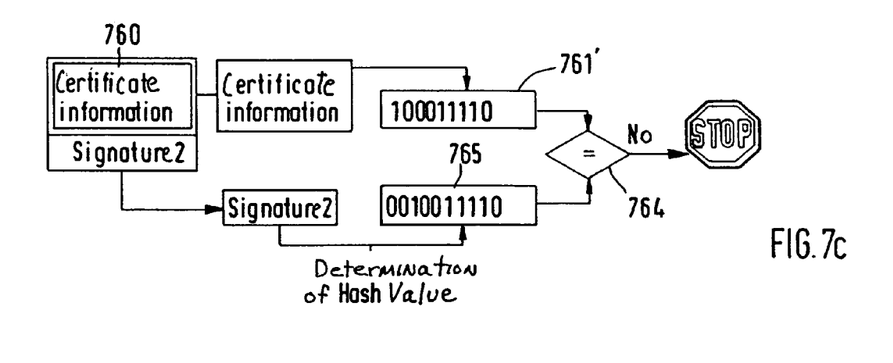

After importing of the new software and the certificate into a control unit, during the next operation, it can then be examined by means of the public key stored in the control unit whether the signature of the certificate is faultless (FIG. 7c). For this purpose, the public key from the control unit is applied to the signature 2, which results in a computed hash code (reference number 765). This computed hash code 765 is compared in a comparator 764 with the hash code 761' formed from the certificate itself according to the above-mentioned hash function. In this case, the two hash codes 765 and 761' do not correspond to one another. In the present case, the certificate had been changed in an unauthorized manner. As a result, the operation of the control unit is stopped (stop).

Figure 7D:
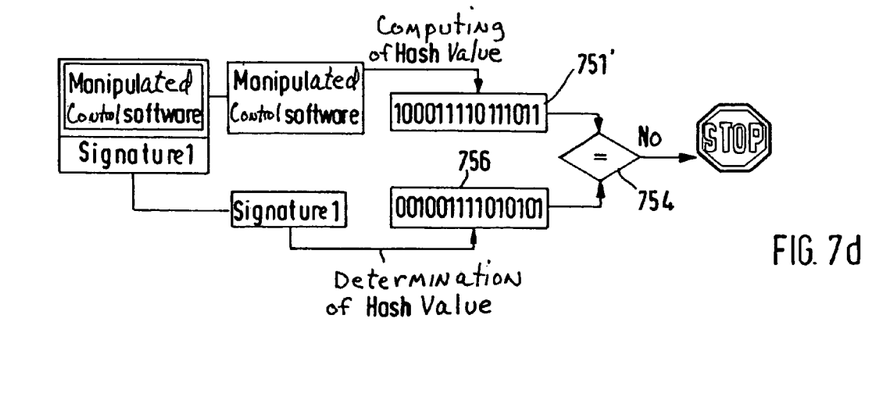

If the certificate is verified as faultless, it is checked in the next step (FIG. 7*d*) whether the software is properly signed. For this purpose, analogous to the signature 1 of the software, the public key from the certificate is used, to define a hash code 756, which is compared in a comparator 754 with the hash code 751' defined directly from the software. In this case, there is no agreement so that the operation of the control unit would again be prevented. However, if the two hash codes 756 and 751' agreed with one another, it would be possible to operate the control unit by means of the new software. In order to prevent a check during each running-up, after the first verification, a check bit can be used which indicates a faultless verification. Naturally, it must not be possible to modify such a test bit from the outside.

In addition to the above-described digital signature, a so-called challenge response process is frequently used for the authentication of a communication partner A with respect to a communication partner B. In this case, B first sends a random number RANDOM to A. A signs this random number by means of his secret key and sends this value as a response to B. B verifies this response by mean of his public key and checks the authentication of A.

Figure 8:
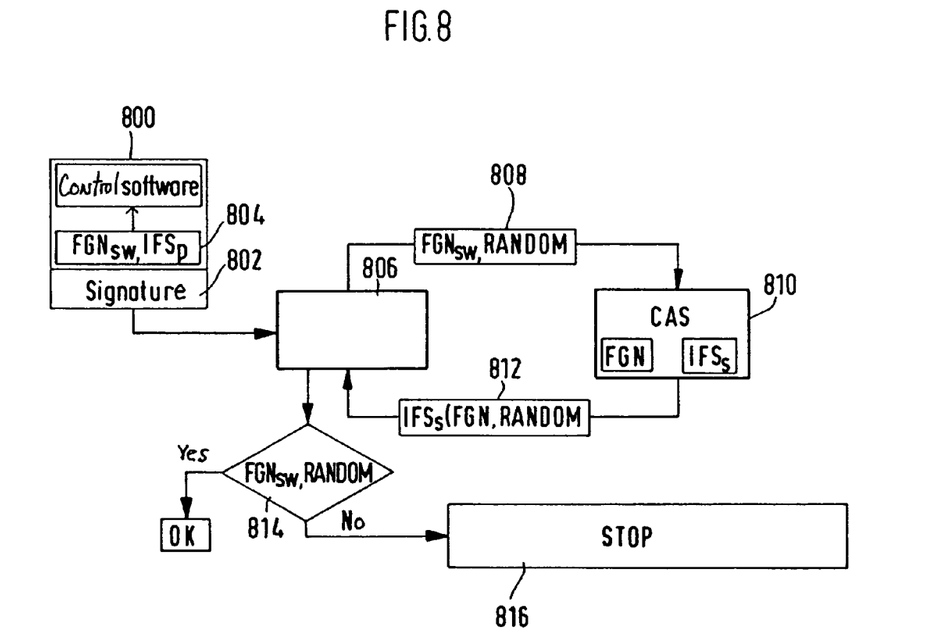
FIG. 8 is a representation of an algorithm for checking vehicle-individual information.

FIG. 8 illustrates the process for ensuring individualization of the software for a specific vehicle reference being made to an above-mentioned challenge response process.

The above-described process of the signature of software is expanded in that the control unit software is also characterized in an individualized manner for a specific vehicle. Any software is connected with an identification characteristic of a specific vehicle or vehicle type. The identification characteristic may, for example, be the chassis number.

In the following, it will be described why the thus characterized software can then only be imported in an operable manner into this vehicle or this vehicle type.

To individualize the software, the chassis number FGNsw is first entered in the software 8, and subsequently the entire software—together with a private key IFSp 804—is signed as described above after the generating of the hash code (reference number 802). As described above, the control unit 806 accepts only correctly signed software. Because the chassis number FGNsw influences the hash code and the signature, it is not possible subsequently to change the chassis number.

If the signature 802 is accepted in principle, it is checked whether the vehicle identification characteristic FGNsw assigned to the software 800 corresponds to the characteristic FGN actually present in the vehicle. If so, the software is cleared. As a result, the software prepared as mentioned above can be used only in a specific target vehicle. For a different vehicle, other software must be procured which is provided with an individual signature.

In order to individualize software, the vehicle chassis number should be registered during its production, in the corresponding control units in a manner which cannot be manipulated. The vehicle chassis number must still be present in the control unit even after the memory has been erased. This can be implemented by registering the chassis number (for example, in the above-mentioned an especially protected car access system (CAS) 810), in a non-volatile memory.

The following approach according to FIG. 8, ensures a query which cannot be manipulated. In addition to the chassis number, another vehicle-specific pair of keys is required which consists of a secret key IFSs and the above-mentioned public key IFSp. The assignment of the chassis number and of the two keys takes place at a central point. The secret key IFSs is stored in the control unit car access system (CAS) 810, specifically in a non-retrievable form.

The vehicle chassis number FGN is already situated in the access area of the car access system.

In the software to be newly imported, in addition to the chassis number, the public key ISPp is also filed (804). Subsequently, the entire software 800 is secured by the signature. After loading of the software into the control unit 806, the correctness of the signature is first tested. Subsequently, the control unit 806 checks by means of the previously described challenge response inquiry whether the chassis number in the software corresponds to that of the vehicle. For this purpose, the control unit sends the chassis number contained in the software FGNsw and a random number RANDOM to the car access system 810 (reference number 808). There the stored chassis number FGN is compared with the received chassis number FGNsw. Subsequently, the two values are signed by means of the secret key IFSs and are sent back to the control unit 806. By means of the public key IFSp, the control unit 806 can now check the signed transmission. Then it is compared (step 814) whether the various related values correspond to one another. If this is so (OK), the control unit 806 can be operated by means of the vehicle-individual software. If the comparison is negative, the operation of the control unit is stopped (step 816).

As a variant of this process, instead of an individual pair of keys IFSs and IFSp, a corresponding pair of keys which is not vehicle-specific can be used which is already stored in the vehicle, eliminating the need for management for this key. Likewise, a corresponding mechanism with a symmetrical cryptographic process is of course also possible. Although this has advantages during the processing, it has the risk that the symmetrical key may be read out of the control units.

Naturally, it should be ensured in the case of all above-mentioned processes that the secret keys of the trust center remain secret. On the whole, the above-mentioned cryptography offers a good possibility of importing only proper software into vehicles or into defined vehicles, and thus of preventing unauthorized manipulations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for authenticating software that is to be stored in a memory for controlling operation of a control unit of a vehicle, said process comprising:

an authorized software installer providing a pair of certificate keys, including first and second certificate keys;

a trust center providing a pair of control unit keys, including first and second control unit keys;

said trust center storing the first control unit key in or accessible to the control unit in the vehicle;

said authorized software installer issuing a certificate request to said trust center, said certificate request containing said first certificate key;

said trust center generating a number of certificates, each certificate comprising a certificate information;
when a plurality of certificates are used,
i) including in certificate information of each certificate, other than a last of said certificates, a first key, of a pair of additional first and second keys, for checking a signature in a certificate that follows, and;
ii) signing each certificate other than a first of said first certificates, using the second key of said pair of additional keys of which the first key is filed in certificate information of a next preceding certificate;
including the first certificate key, contained in said certificate request, in certificate information of the last of said certificates, for checking signature of said software;
signing certificate information of the first of said certificates using the second control unit key, issued by the trust center;
said authorized software installer signing software that is to be entered, by means of said second certificate key, provided by said authorized software installer;
said authorized software installer importing all signed certificates into the control unit;
said authorized software installer importing the signed software into the control unit;
said control unit using said first control unit key, provided by said trust center, and said first certificate key, provided by said authorized software installer, to authenticate the software, by checking the signature of the first certificate by means of the first control unit key filed in or accessible to the control unit and, when a plurality of certificates are used, authenticating the signature of each additional certificate by means of a first key contained in certificate information of a next preceding certificate;
accepting certificate information of a respective certificate if checking thereof has a positive result;
checking the signature of the software using the first certificate key included in the certificate information of the last certificate; and
authenticating the software if said checking also has a positive result; wherein
the second control unit key is known only to said trust center, and said second certificate key is known only to said authorized software installer, which is an entity different from said trust center;
at least one vehicle-specific information for the vehicle containing the control unit is added to the software;
the at least one vehicle-specific information is signed by means of the software;
in addition to checking the signatures of the certificates and of the software, the vehicle-specific information is also checked;
the software is accepted in the control unit only when the vehicle-specific information of the software also corresponds to that of the vehicle;
for checking vehicle-specific information, a vehicle-specific pair of keys is generated in one of a vehicle security unit and the control unit, the vehicle-specific information and a key of the vehicle-specific pair of keys being present;
in addition to the vehicle-specific information, the additional key of the vehicle-specific pair of keys is filed in the software;

in a separate routine, a check is made whether the keys of the vehicle-specific pair of keys match; and
the imported software is accepted if the answer is affirmative.

2. The process according to claim 1, wherein the software is tested at least during a first start-up of the control unit, and is then correspondingly characterized.

3. The process according to claim 1, wherein in the event of an external access to the control unit, an access unit checks whether an authorization exists for the access.

4. The process according to claim 3, wherein a code is requested by a control unit and the code is checked for validity.

5. The process according to claim 4, wherein:
the control unit supplies a random number which is to be signed by the accessing party; and
the signature applied to the random number is checked in the control unit using an authentication key.

6. The process according to claim 3, wherein:
when access authorization is queried, an authorization stage is determined; and
access actions are accepted or not accepted as a function of the authorization stage.

7. The process according to claim 1, wherein a security device in the vehicle performs an authentication check of a control unit at least aperiodically, and registers the control unit in the event of a negative result.

8. The process according to claim 7, wherein a control-unit-individual secret code is filed in the control unit.

9. The process according to claim 7, wherein the security device queries a control-unit-specific characteristic and checks the latter with respect to authenticity.

10. The process according to claim 7, wherein during the authentication check, a key is used which is stored in one of the security device and the control unit.

11. The process according to claim 1, wherein:
a public key is contained in a certificate as the certificate information; and
a signature to be checked thereby is generated by means of a pertaining secret key.

12. The process according to claim 11, wherein:
the first control unit key, is a public key; and
the second control unit key is a secret key.

13. The process according to claim 11, wherein:
a control unit in the vehicle generates an asymmetric pair of keys with a public and a secret key;
the public key is filed in a control unit in the vehicle; and
the private key can be read out of the vehicle for signing the first certificate.

14. The process according to claim 1, wherein the first control unit key is filed in the boot sector of the control unit.

15. The process according to claim 14, wherein after input of the key, the boot sector is blocked and is thus protected against further access.

16. The process according to claim 1, wherein at least one of the software and the certificate information is imaged on an information of a defined length and said information is then signed.

17. The process according to claim 16, wherein a hash function is selected as the imaging function.

* * * * *